No. 769,622. PATENTED SEPT. 6, 1904.
H. MASTERS.
EYEGLASSES.
APPLICATION FILED MAY 26, 1904.
NO MODEL.
Fig. 1.
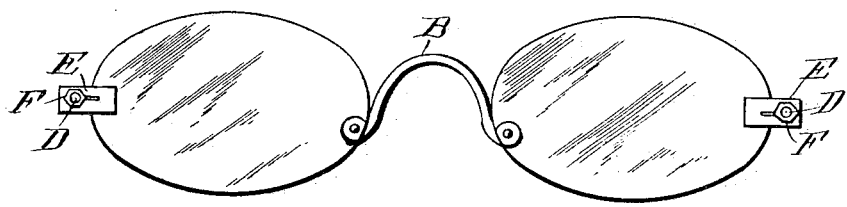
Fig. 2.
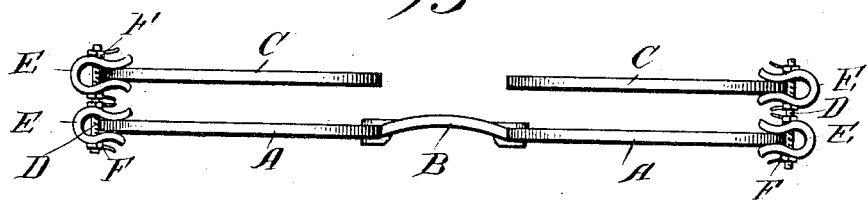
Fig. 3. Fig. 4.
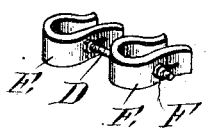 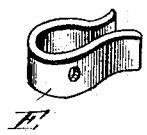
WITNESSES:
C. Edward Duffey
Perry B. Turpin
INVENTOR
Hanford Masters
BY Munn & Co.
ATTORNEYS No. 769,622.

Patented September 6, 1904.

UNITED STATES PATENT OFFICE.

HANFORD MASTERS, OF BUTTE, MONTANA.

EYEGLASSES.

SPECIFICATION forming part of Letters Patent No. 769,622, dated September 6, 1904.

Application filed May 26, 1904. Serial No. 209,952. (No model.)

*To all whom it may concern:*

Be it known that I, HANFORD MASTERS, a citizen of the United States, and a resident of Butte, in the county of Silverbow and State of Montana, have made certain new and useful Improvements in Eyeglasses, of which the following is a specification.

My invention is an improvement in eyeglasses, and particularly in glasses involving double lenses or two pairs of lenses; and the invention consists in certain novel constructions and combinations of parts, as will be hereinafter described and claimed.

In the drawings, Figure 1 is a front elevation of my improved glasses. Fig. 2 is an edge view thereof. Fig. 3 is a detail perspective view of one of the connecting devices, including two bow-clamps, the screw-shaft, and the nuts thereon; and Fig. 4 is a detail perspective view of one of the bow-clamps.

In carrying out my invention I employ what for convenience of reference I term the "main" eyeglass, comprising the lenses A and the nose-piece B. In connection with this main-eyeglass construction I employ the supplemental lenses C and the connecting devices which carry the supplemental lenses and which are shown in detail in Fig. 3. These devices include the threaded shaft D, the bow-clamps E thereon, and the nuts F, threaded on the screw-shaft D and adapted to be operated to compress the bow-clamps to cause them to tightly grip their respective lenses A or C, as will be understood from Fig. 2 of the drawings. By this construction I am able to support the supplemental lenses at their outer edges and leave them entirely disconnected at their inner edges and also can adjust the supplemental lenses to any desired degree in order to secure a proper fit of the glasses, as will be desired by the user. It will also be noticed that the second or supplemental pair of lenses C may be attached or removed at will from the main or ordinary glass and that the nuts may be adjusted on the screw-shaft to properly clamp the lenses and support the supplemental lenses as desired.

It will be noticed the bow-clamps clamp directly upon the lenses and are slightly outturned at their free ends, forming rounded surfaces to press against the lenses, so they can be applied tightly to the lenses without injuring the latter.

The nuts may preferably be provided with projecting pins, as shown, so that they can be readily turned by the finger.

Having thus described my invention, what I claim as new, and desire to secure by Letters Patent, is—

1. The improvement in eyeglasses herein described comprising the main eyeglasses having the lenses and the bow, the supplemental lenses and the connecting devices consisting of the screw-shafts, the bow-clamps fitting on the screw-shafts and embracing their respective lenses, and the nuts on the screw-shaft for compressing the bow-clamps upon their lenses substantially as and for the purposes set forth.

2. The combination of the main eyeglasses, the screw-shafts, means for securing the screw-shafts at one end to the main eyeglasses, the supplemental lenses, the bow-clamps on the screw-shafts and embracing the supplemental lenses and means for compressing the clamps upon the supplemental lenses.

3. The combination of the main eyeglasses, the supplemental lenses, the screw-shafts, means for securing the screw-shafts to the supplemental lenses, and the bow-clamps on the screw-shafts and embracing the lenses of the main eyeglasses and means for compressing such bow-clamps.

4. The combination with the main eyeglasses of the screw-shafts secured to and projecting forwardly from the main eyeglasses, the supplemental lenses and means for supporting the supplemental lenses from said screw-shafts.

5. The combination of the main eyeglasses, the supplemental lenses, bow-clamps embracing the supplemental lenses, and means supporting said bow-clamps from the main eyeglasses.

6. The combination with the main eyeglasses of the supplemental lenses supported adjustably in advance of the main eyeglasses whereby they may be set back and forth in the direction of the axis of said lenses substantially as set forth.

7. The combination of the main eyeglasses, the supplemental lenses, the bow-clamps embracing the lenses of the main eyeglasses, and means supporting the supplemental lenses from said bow-clamps, substantially as set forth.

HANFORD MASTERS.

Witnesses:
 DAVID CALDWELL,
 WILLIAM JACKSON.